(12) United States Patent
Palmon et al.

(10) Patent No.: US 7,193,733 B2
(45) Date of Patent: Mar. 20, 2007

(54) DIGITAL SKEW CORRECTION METHOD AND APPARATUS FOR MULTI COLOR PRINTING MACHINE

(75) Inventors: Sharon Palmon, Kfar Saba (IL); Avichai Meged, Herzliya (IL); Refael Bronstein, Kfar Saba (IL)

(73) Assignee: A.I.T. Israel-Advanced Imaging Technology Ltd., Tel-Aviv (IL)

( * ) Notice: Subject to any disclaimer, the term of this patent is extended or adjusted under 35 U.S.C. 154(b) by 638 days.

(21) Appl. No.: 10/658,601

(22) Filed: Sep. 9, 2003

(65) Prior Publication Data

US 2004/0095618 A1    May 20, 2004

Related U.S. Application Data

(63) Continuation of application No. 09/708,089, filed on Nov. 8, 2000, now Pat. No. 6,624,901.

(60) Provisional application No. 60/197,990, filed on Apr. 18, 2000.

(51) Int. Cl.
*H04N 1/04* (2006.01)

(52) U.S. Cl. .................. 358/1.1; 358/489; 358/494
(58) Field of Classification Search .............. 358/489, 358/490, 491, 493, 494, 495, 1.1, 1.2, 1.7, 358/1.8; 347/169
See application file for complete search history.

(56) References Cited

U.S. PATENT DOCUMENTS

| | | | |
|---|---|---|---|
| 4,575,769 A | * | 3/1986 | Arnoldi ................. 358/498 |
| 4,591,880 A | | 5/1986 | Mitsuka |
| 4,745,487 A | | 5/1988 | Nishikawa |
| 4,860,651 A | | 8/1989 | Ishii et al. |
| 4,897,737 A | | 1/1990 | Shalev |
| 5,321,426 A | | 6/1994 | Baek et al. |
| 5,351,617 A | | 10/1994 | Williams et al. |
| 5,668,588 A | | 9/1997 | Morizumi et al. |

* cited by examiner

*Primary Examiner*—Thomas D. Lee
(74) *Attorney, Agent, or Firm*—Katten Muchin Rosenman LLP

(57) ABSTRACT

The present invention enables helical scanning of an image and results in a rectangular image, centered on the imaging media with its boundaries parallel to the media edges and/or to the gripper line.

19 Claims, 11 Drawing Sheets

DIGITAL SKEW CORRECTION METHOD AND APPARATUS FOR MULTI COLOR PRINTING MACHINE

CROSS REFERENCE TO RELATED APPLICATIONS

This is a continuation of pending U.S. application Ser. No. 09/708,089, filed Nov. 8, 2000, which claimed priority to U.S. Provisional Application 60/197,990, filed Apr. 18, 2000.

BACKGROUND OF THE INVENTION

Recently, both computer-to-plate and on-press digital imaging of offset plates have become widely spread. The imaging may be performed by a large number of writing beams to increase the image exposure speed.

A conventional multi-beam scanning apparatus may comprise a rotating drum and a scanning head having a plurality of laser diodes movable parallel to the axis of the drum. An exposure medium, such as an offset plate, may be mounted around the outer peripheral surface of the drum.

The drum may rotate at a fixed rotational speed indicating the fast scanning direction. Concurrently, the scanning head may move at a fixed speed, synchronized with the rotation of the drum in the axial direction of the drum indicating the slow scanning direction. On each rotation of the drum, the scanning head progresses a distance W. W is termed the scanning swath width. As a result of the two movements, each laser diode spirally scans the outer peripheral of the drum, forming a scanning line at an angle $\alpha$ to a direction perpendicular to the axis of the drum.

The resulting image exposed in this helical mode is not rectangular but rather slanted at angle $\alpha$, forming a parallelogram. The helical angle $\alpha$ is a function of the width W and the drum circumference DC, where $$\tan\alpha = \frac{W}{DC}.$$

The number of exposure beams N and the resolution R define the scanning swath width as W=N/R, hence $\alpha$=arctangent [(N/R)/DC]. The helical angle $\alpha$ increases as the number of beams N increases. For example, for 32 beams at a resolution of 2540 dots per inch (100 dots/mm) and a drum circumference of 640 mm, the helical angle is: $\alpha$=arctangent [(N/R)/DC]=arctangent [(32/100)1640]=0.0005 radians. If the number of beams is increased to 48 beams the helical angle $\alpha$ is increased to 0.00075 radians. In order to ensure the rectangular form of an image exposed in a helical mode, it is necessary to compensate for the deficiency described hereinabove.

Some existing methods for image distortion correction include inclining the scanning head itself at an angle equal to the helical angle, feeding the exposure media at the helical angle or advancing the recording start position for the scanning lines as scanning progresses. These methods may result in a rectangular image, which is inclined with respect to the central axis of the imaging cylinder at an inclination angle $\alpha$. This solution may be acceptable to some extent for computer-to-plate devices. However, it is generally unacceptable for automated computer-to-press imaging systems.

There is a need to provide a simple and flexible method of image distortion correction that would support the exposure with a varying number of beams and at variable exposure resolutions, without the need to make any mechanical adjustments on the press.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
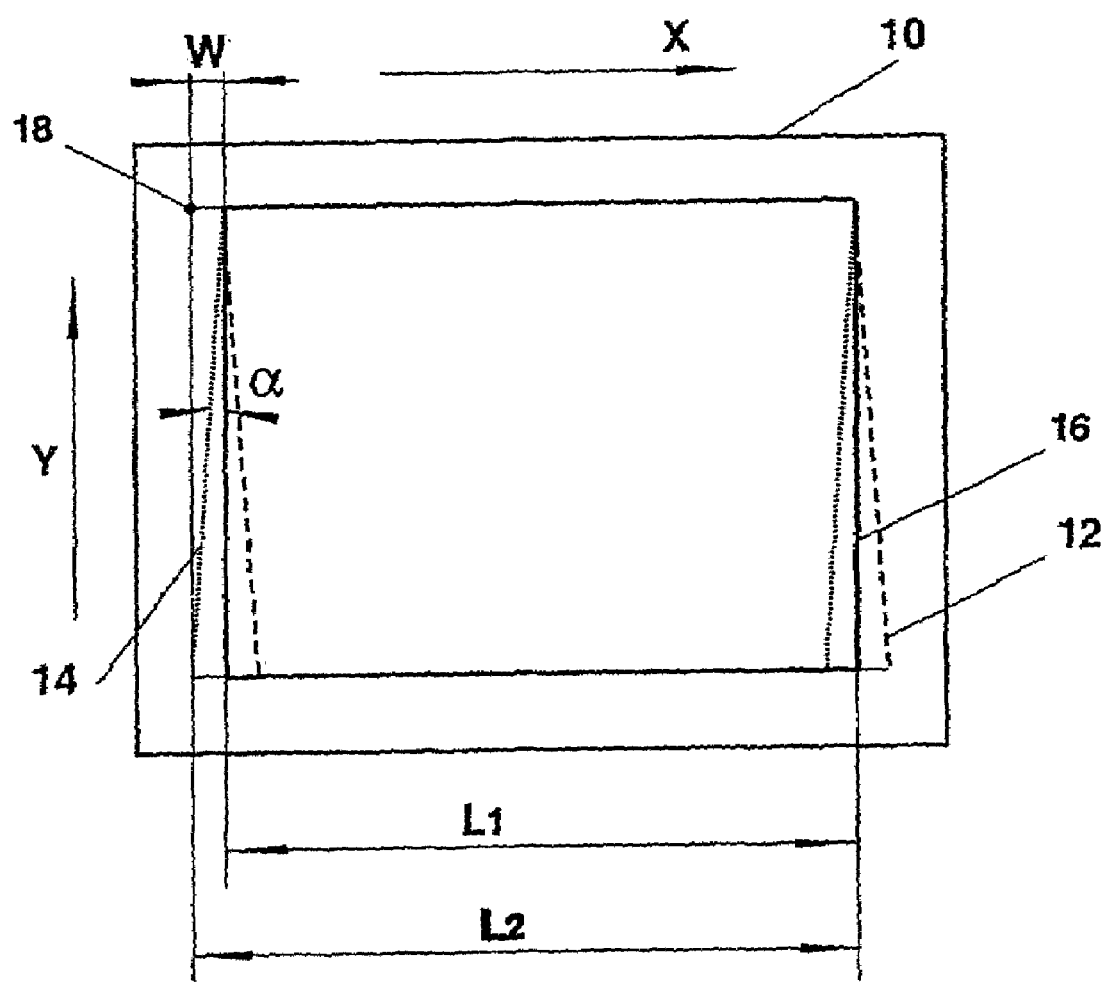
FIG. 1 illustrates an exposure plate performed according to an embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures and components have not been described in detail so as not to obscure the present invention.

Embodiments of the present invention are directed to helical multi-beam scanning apparatus and methods resulting in a rectangular exposed image with its edges parallel to the gripper line. Throughout the specification and claims, whenever one of the terms "marking", "printing" and "recording" is used, the intention is to any of these terms.

Reference is now made to FIG. 1, which is an illustration of an exposure plate 10 such as the surface of a rotating drum or a flat bed. In a conventional multi-beam scanning system, the resulting image exposed in a helical mode is slanted at an angle $\alpha$ with respect to the gripper line as illustrated by a dashed-line parallelogram 12. Some embodiments of the present invention teach skewing the image data with respect to the gripper line, prior to the exposure. The image is skewed at angle α but in the opposite direction, as illustrated by a dotted-line parallelogram 14. A solid-line rectangle 16 illustrates the resulting exposed image of a helical multi-beam scanning according to an embodiment of the present invention, which is congruent to an original rectangular image. Arrow Y illustrates the fast scanning direction and arrow X illustrates the slow scanning direction. Parallelogram 14 representing the skewed image has a larger size L2 in the slow scanning direction X than the corresponding dimension L1 of the original image 16. The increase in digital image size, (L2−L1), is equal to the width of one swath W, which is equal to N/R, where N is the number of imaging beams and R is the resolution. Thus, the position of the starting-point of the scanning may be shifted (by W) in the axial direction to a new origin 18. This exposure produces a "back-to-original" position of the skewed image.

Figure 2:
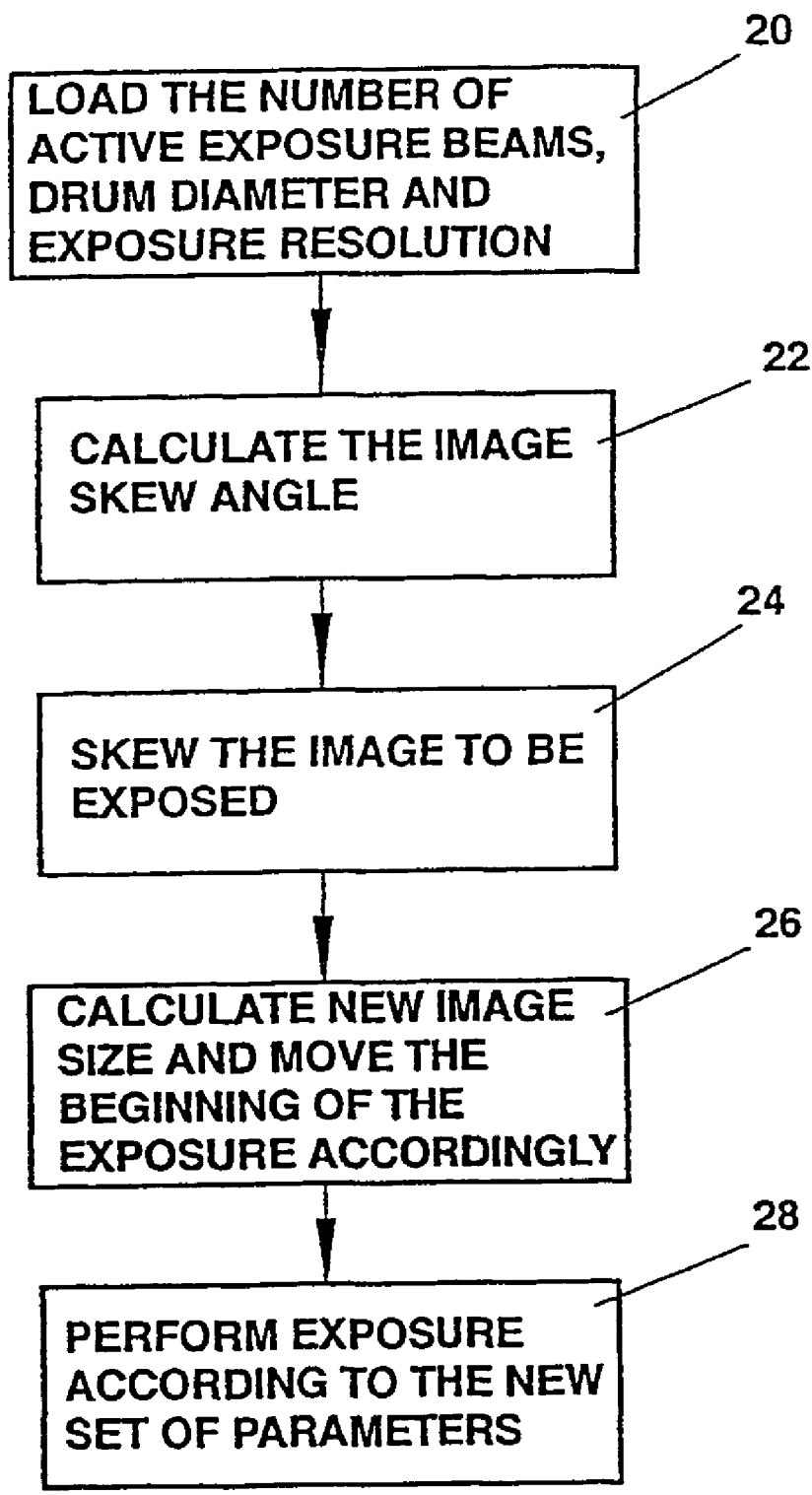
FIG. 2 is a flow chart of image skewing prior to plate exposure according to the present invention.

Reference is now made to FIG. 2, which is a flow chart of the operation of image skewing prior to plate exposure according to an embodiment of the present invention. Initially, the program loads parameters for calculating the helical angle, such as the number of exposure beams N, drum diameter d and exposure resolution R (step 20). Next, the skew angle is calculated (step 22) and the digital image is skewed (step 24).

For example, the procedure for skewing a full size 1000 mm×1000 mm image to be exposed at a resolution of 100 dots per millimeter, with a linear agglomerate array of 100 diodes is as follows: The first thousand pixels of the input scanning line are shifted by one pixel in the slow scanning direction, the second thousand pixels of the input scanning line are shifted by two pixels in the slow scanning direction until the hundredth thousand pixels of the input scanning line are shifted by a hundred pixels in the slow scanning direction.

After calculating a new size for the skewed image and accordingly new coordinates for the origin of the exposure (step 26), the image exposure may be performed according to the new set of coordinates of the pixels (step 28), which may result in a rectangular image having edges parallel to the plate edges and, accordingly, parallel to the paper edges and the gripper line at the time of printing.

The image-skewing method described hereinabove may be applicable to a printing press capable of carrying more than one image on a plate cylinder, for example the 74 Karat press, commercially available from Karat Digital Press BV, Holland or the Heath press, commercially available from Heath Custom Press, Inc. USA. This algorithm is also applicable to duplex printing (two-side printing). Each side may be exposed at different exposure resolutions and with a different number of beams.

Software-based image skewing as described hereinabove is relatively simple and fast for vector-type images such as files in PostScript format. However, it may be time consuming for raster images such as images carrying pictorial information.

Another embodiment of the present invention may treat equally both images in PostScript format (vector) and images in pictorial (continuous tone) format. In this embodiment, each sub-raster input scanning line is divided into sections, which are directed to different output lines. As a consequence, each scanning line is exposed by several laser beams. In a conventional helical mode, when no correction is applied to the image by modifying the pixel coordinates, each sub-raster input scanning line corresponds to an output data line, which is exposed as a whole by one laser beam.

Figure 3:
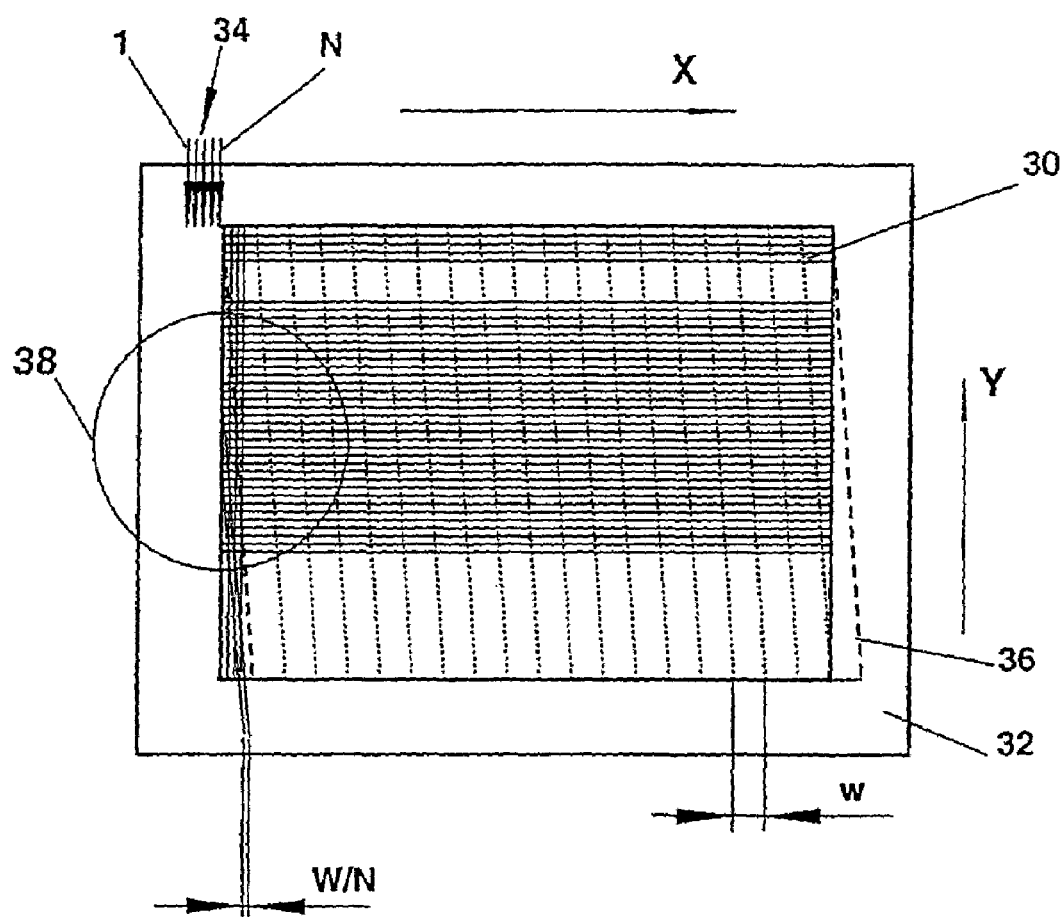
FIG. 3 illustrates a plate exposure performed according to another embodiment of the present invention.

Reference is now made to FIG. 3, which illustrates a plate exposure performed according to an embodiment of the present invention. An image is exposed in a helical mode on a plate 32. Arrows X and Y indicate, respectively, the slow and fast scanning directions. Helical scanning according to an embodiment of the present invention may result in a rectangular image 30, while helical scanning without skewing the image data prior to the exposure may result in a parallelogram image 36.

W indicates the width of a scanning swath 34, which comprises N beams. W/N is the width of a scanning sub-raster or a single exposure line. The image recording is performed by gradual activation of the recording and/or exposing beams into operation from beam N to beam 1. Each exposing beam is activated at a point where it enables skewed image rectification. Each exposing beam is related to an exposure line that may comprise sections from more than one input line according to the skewed image. The image recording at the last exposure swath is performed in gradual deactivation of the recording and/or exposing beams from N to 1.

Figure 4:
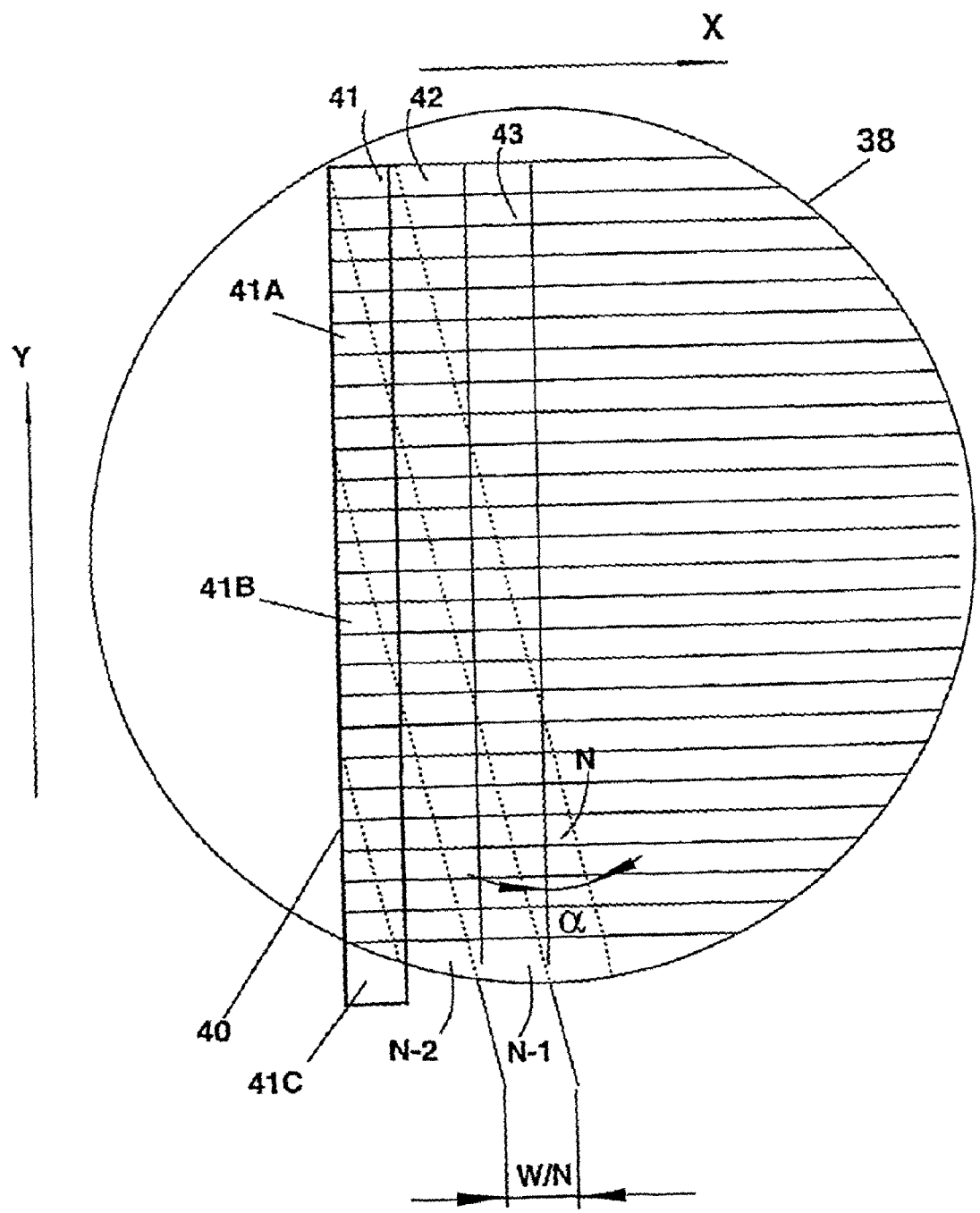
FIG. 4 is an enlargement of a portion of FIG. 3.

FIG. 4 is an enlargement of area 38 of FIG. 3. Line 40 illustrates the border of image 30. The areas between slanted-dashed lines represent exposure beams N, N-1 and N-2. The columns between vertical solid lines represent input scanning lines 41, 42 and 43. Each scanning line is divided into sections. For illustration purposes, only sections 41A, 41B and 41C of image line 41 are indicated. Assuming that N laser beams of swath 34 (of FIG. 3) perform the exposure. First, sections 41A, 41B and 41C of scanning line 41 are exposed. This is achieved by gradual entrance of successive laser beams, from beam N to beam 1, until all exposure beams are activated. Each scanning line is exposed by a multiplicity of exposing beams as illustrated by the overlapping of beams N, N-1 and N-2 on scanning lines 41, 42 and 43.

Figure 5:
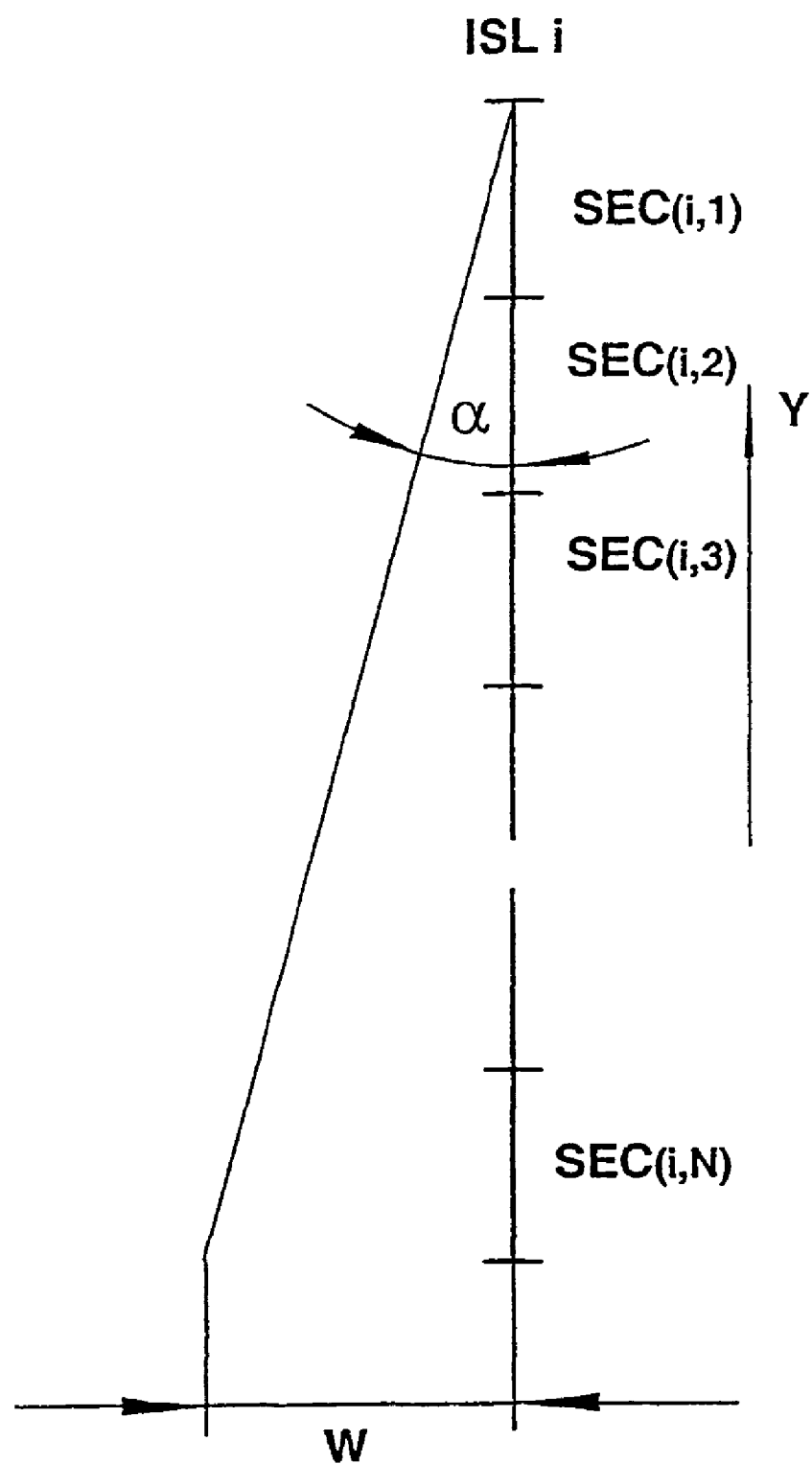
FIG. 5 is a schematic illustration of an image scanning line divided into N sections.

Reference is now made to FIG. 5 which is a schematic illustration of an image scanning line ISL(i) divided into N sections, Sec (i,1) to Sec (i,N). The number of possible shifts in the axial direction is equal to the number of exposing beams in a laser array and hence the scanning line is divided in N sections. When the scanning comprises K scanning swaths, the input image data is divided into $N^2K$ sections.

The length of a section is defined by the minimum amount of pixels exposed in the fast scanning direction (Y), during a shift of one pixel in the slow scanning direction (X). All the sections are of the same length when the vertical resolution equals the horizontal resolution.

In a more general case, however, there is a need to stretch the image in a local non-linear way in order to compensate for mechanical inaccuracies of an exposure drum or irregularities of an exposure table movement. This is achieved by varying the resolution within the same exposure line and hence different segments of the same scanning line may have different resolutions and hence sections of the same scanning line may have different lengths.

In order to determine the lengths of N sections of scanning line ISL(i), the following N+1 formulas are solved:

$$\text{Tan}(\alpha) = \frac{1 \text{ pixel} \times \text{Vertical\_Resolution}(i, j)}{\text{Length}[\text{Sec}(i, j)] \times \text{Horizontal\_Resolution}(i, j)}$$

$$\sum_{j=1,N} \text{Length}[\text{Sec}(i, j)] = DC$$

where Vertical_Resolution is the resolution in the fast scanning direction and Horizontal_Resolution is the resolution in the slow scanning direction. The first formula assumes averaging and/or mapping of the resolution over the number of exposure beams.

The rectangular shape of the exposed image may be achieved by gradually shifting sections of an input line between several exposure lines. When imaging at a variable resolution, the data for one swath of N beams comprise $N^2$ sections from 2N-1 consecutive input scanning lines. 2N-1 input scanning lines may be required for producing one cylinder rotation exposure with N exposure beams performing the compensation for image skewing as will be explained in more detail with respect to FIG. 7. In a particular example of exposure with 40 beams, at least 79 input scanning lines are required for skew compensation.

Figure 6:
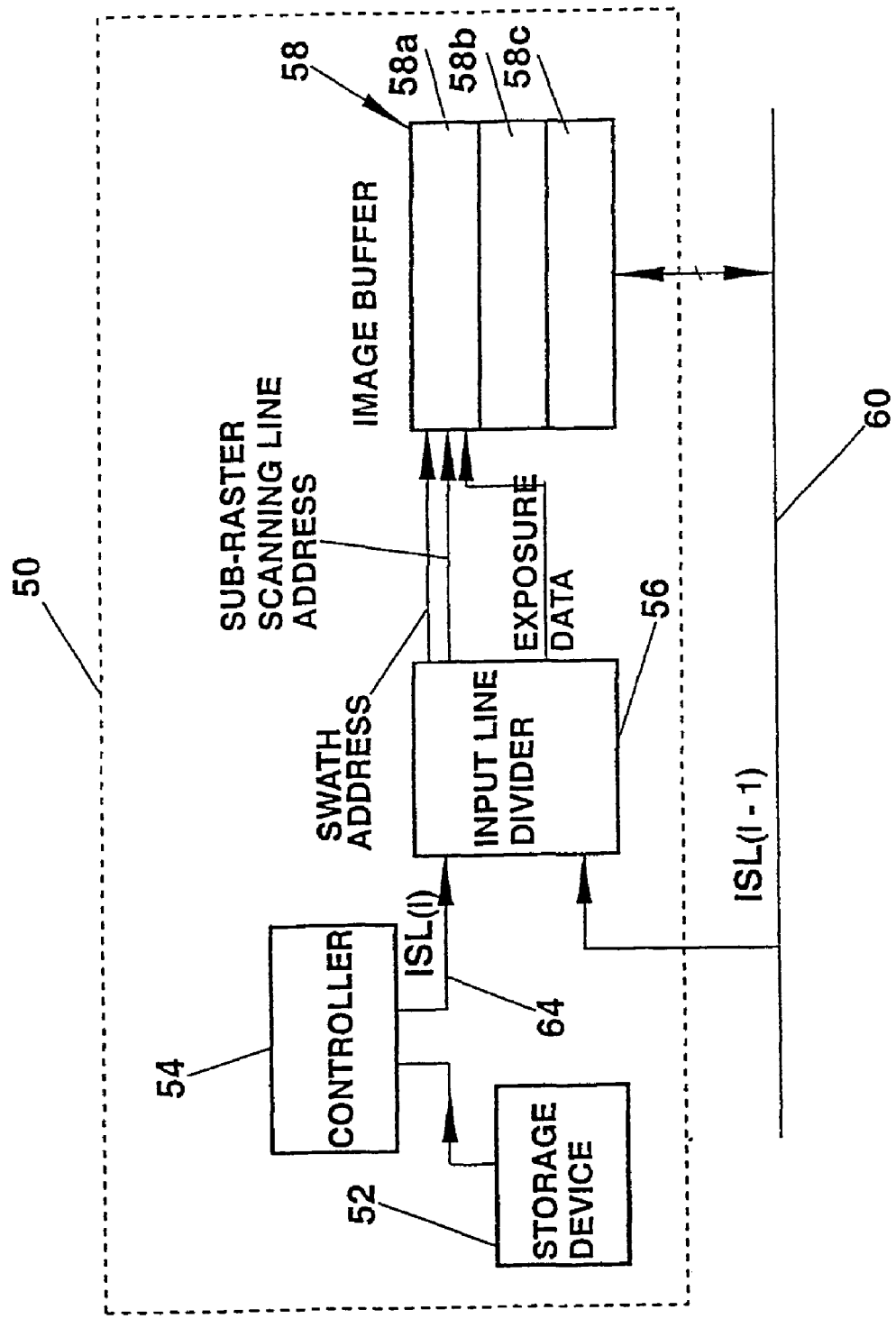
FIG. 6 is a block diagram of an electronic apparatus operable according to the present invention.

Reference is now made to FIG. 6, which is a block diagram of an electronic apparatus according to an embodiment of the present invention. Electronic apparatus 50 comprises a storage device 52, a controller 54 coupled to storage device 52, an input image line divider 56 coupled to controller 54 and an image buffer 58 coupled to divider 56. Both divider 56 and buffer 58 are coupled to a memory bus 60. A digital raster image, consisting of a plurality of scanning swaths k, where k is between $0 < k \leq K$, is stored on storage device 52 such as a disk. Each scanning swath comprises N sub-raster image scanning lines ISL(i). Thus the input image is comprised of N×K input data lines. The sub-raster image scanning lines correspond to a plurality of output data lines, each of which is exposed by its own laser beam if no correction for the image skew is made.

The image data to be corrected is initially loaded in swath wide portions into input line divider 56, which will be described in detail with respect to FIG. 8. Input line divider 56 generates a particular scanning swath address k and a particular sub-raster image scanning line address i within the swath. Both addresses are fed into image buffer 58. Image buffer 58 is divided into at least three different areas 58A, 58B and 58C, where successive exposure swaths are stored.

Divider 56 also provides image exposure data for one of the areas of buffer 58. This exposure data is generated based on input scanning line data ISL(i) 64 and on information from the previous input scanning line ISL(i-1), which is already stored in one the image buffer areas 58A–58C.

Figure 7:
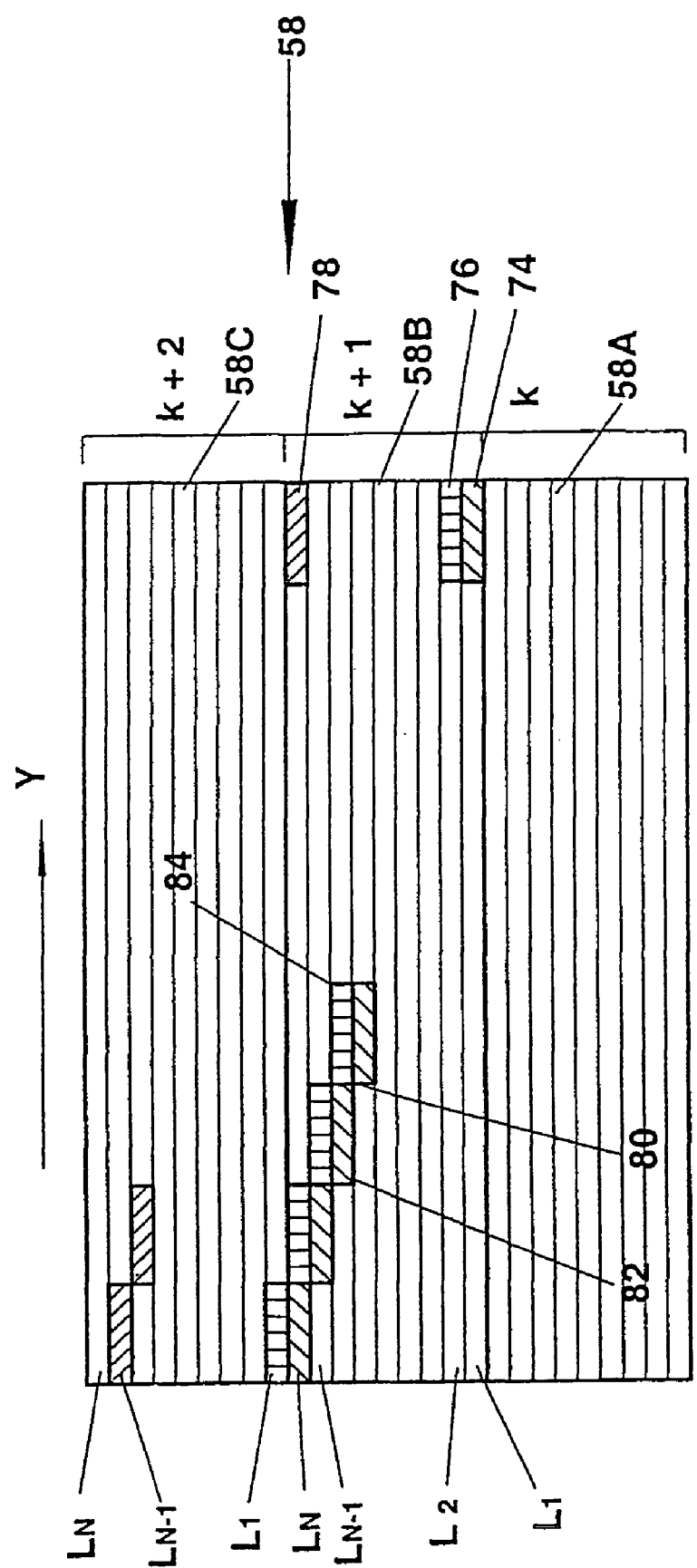
FIG. 7 is an illustration the memory buffer of FIG. 6.

Reference is now made to FIG. 7, which is an illustration of memory buffer 58 of FIG. 6. Buffer 58 may contain the minimum number of swaths required to perform image skew compensation. The situation, which is illustrated as an example, is of two consecutive buffers 58C and 58B, which are being filled with serial skewed image data lines for swaths k+2 and k+1 and of buffer 58A, already filled with skewed data for swath k, which is being exposed. Sections of the first input line ISL(1) are illustrated by left-inclined hatched rectangles 74. Sections of the second input line are illustrated by vertical hatched rectangles 76. Sections of the last input line of swath k+1 are illustrated by right-inclined hatched rectangles 78. Sections of one image scanning line ISL(i) may belong to more than one exposure swath and may, accordingly, be stored in more than one buffer, but not in more than two adjacent buffers.

Each scanning swath may comprise $N^2$ sections. The first input scanning line ISL(1) contributes its N sections only to output lines $L_1$–$L_N$ of swath k+1. The second input line of swath k+1 contributes also one section to output line $L_1$ of swath k+2, the third input line of swath k contributes two sections to swath k+2 and so on. The continuity of data within an exposure line in buffer 58 is ensured by a proper matching mechanism. This mechanism seamlessly attaches the head of a section of an input scanning line to the tail of a second section from a different input scanning line or from the same input line, as is described in FIG. 8.

Figure 8:
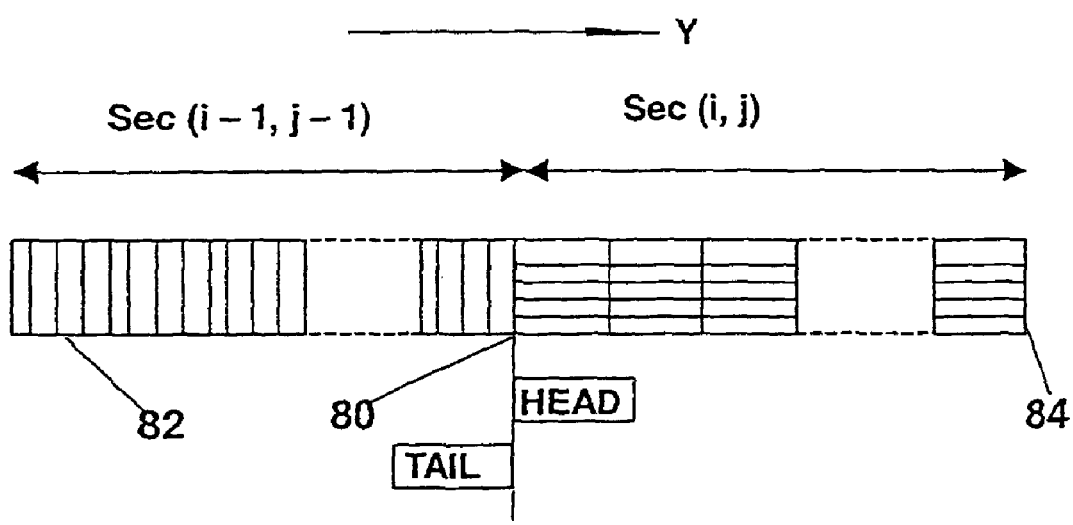
FIG. 8 is an illustration of the attachment mechanism for successive sections of an exposure line according to an embodiment of the present invention.

FIG. 8 is an illustration of a connection-point 80 between sections 82 and 84 of FIG. 7. Each output line may be assembled of sections composed of data shifted from different input scanning lines. There is a need to attach this data seamlessly within one line that may be exposed by the same exposing laser beam.

Section 82 is marked as Sec (i−1, j−1) and section 84 is marked as Sec (i, j). In this example, the tail is defined as the end of Sec (i−1, j−1) and the head is defined as the beginning of section Sec (i, j). The sections may be stored in the memory in units, which may have a different size than the width of a recording pixel. This may create a need to write and read a single pixel from more than one memory section. Generally, the memory address may be changed in both the i and j directions. In some cases, two consecutive lines should follow each other and only Sec (i−1, j−1) and Sec (i, j) may be seamlessly attached.

Figure 9:
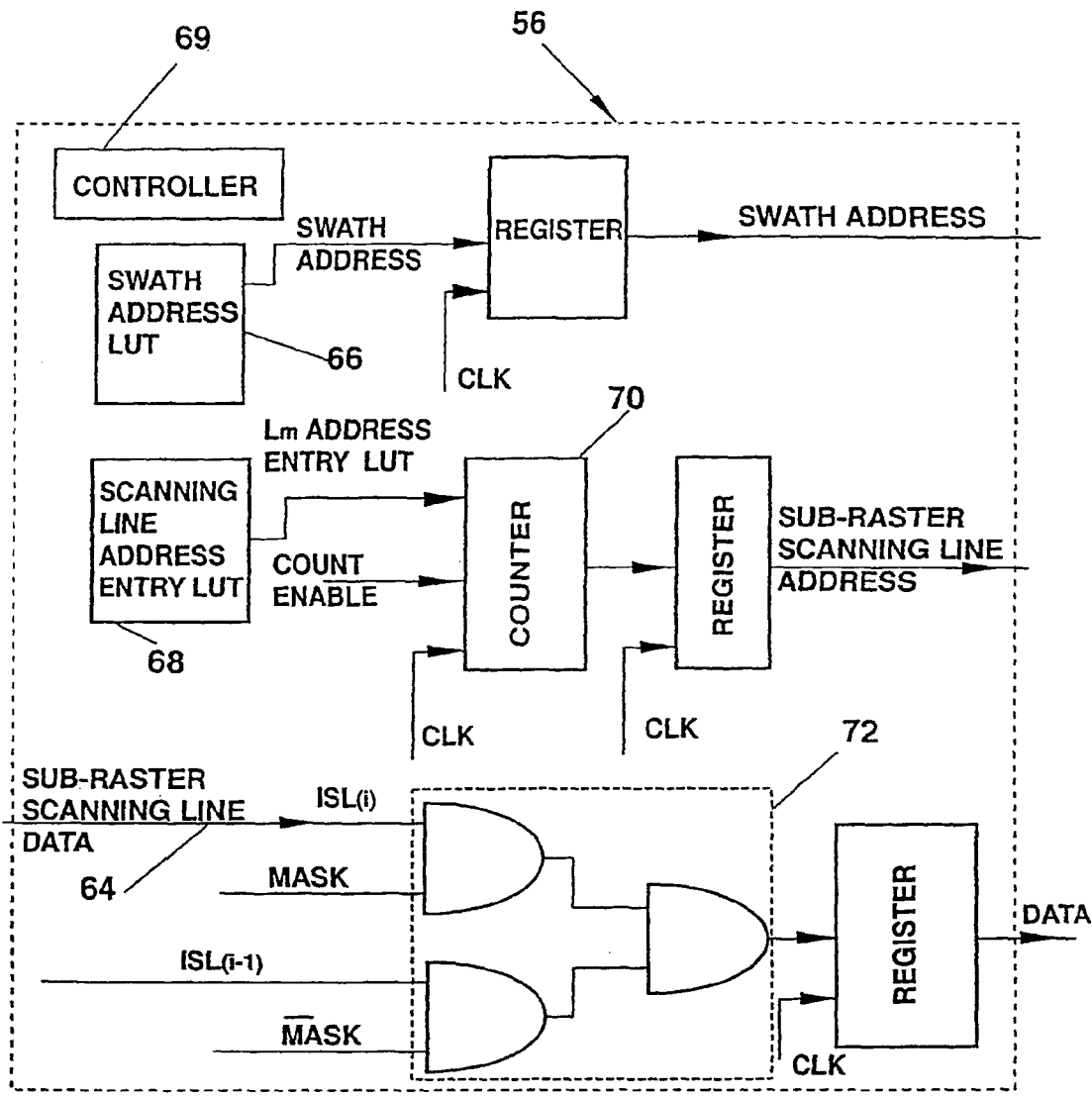
FIG. 9 is a block diagram of the input line divider of FIG. 6.

Reference is now made to FIG. 9, which is a block diagram of input line divider 56 of FIG. 6. Divider 56 comprises a swath address look up table (LUT) 66, a scanning line address entry LUT 68, a controller 69, an up-counter 70 and a mask mechanism 72. Input scanning line data ISL(i) 64 is provided to line divider 56. Line divider 56 divides input line ISL(i) into sections, each of which is allocated a swath address and sub-raster scanning line address. The swath address is stored in LUT 66 and the sub-raster scanning line address is stored in LUT 68. The exposure data may be provided to buffer 58 in the following way: firstly, sections j from successive input lines are provided to buffer 58 to be stored in the appropriate place according to the skew angel. Next, sections j+1 are provided until the buffer is filled with $N^2$ sections. Whenever a new section is provided to buffer 58, controller 69 loads a new swath address from LUT 66 and a new sub-raster scanning line start address from LUT 68 into buffer 58. The following sub-raster scanning line addresses are generated by up-counter 70.

The continuity of data within an exposure line in buffer 58 is ensured by mask mechanism 72. Mask mechanism 72 is responsible for the attachment of a head of section (i,j) to a tail of section (i−1, j−1) already stored in image buffer 58 as was described in details with respect to FIG. 8.

In another embodiment of the present invention, the need for a seamless attachment mechanism may be eliminated. This embodiment may be more convenient to implement from the aspect of memory handling, especially when the input data stream is "block by block" (e.g., compressed data) rather than "line by line" data stream.

Figure 10:
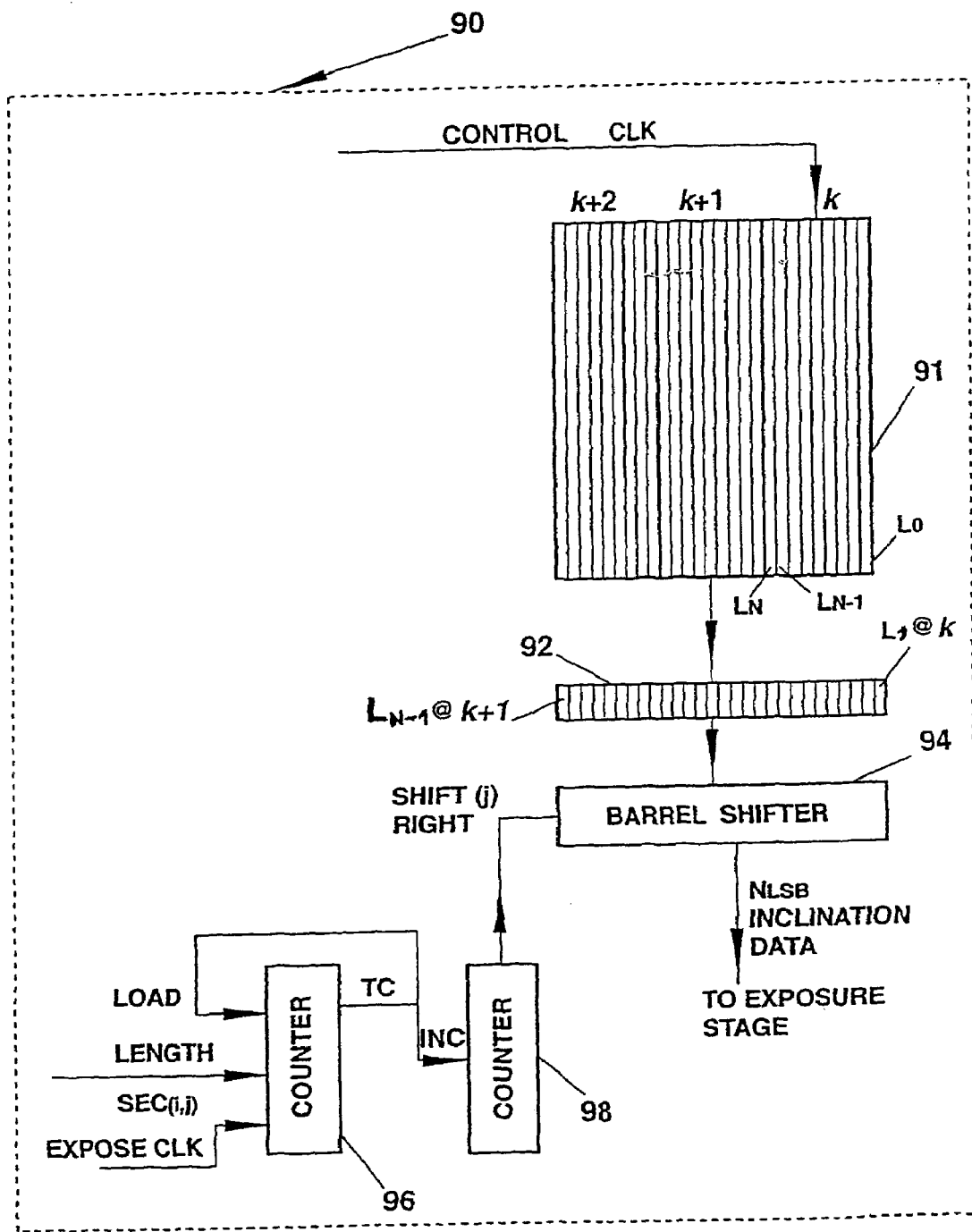
FIG. 10 is a block diagram of an exposure and printing apparatus operating according to an alternative embodiment of the present invention.

Reference is now made to FIG. 10, which is a block diagram of an electronic apparatus according to another embodiment of the present invention. In this embodiment, input data may be stored in an image buffer consecutively, without division into sections and without the resultant skewing. The division and the skewing may be performed "on-the-fly", when data is loaded from the image buffer to the exposure beams.

Apparatus 90 comprises an image buffer 91, a memory register 92 coupled to buffer 91, a barrel shifter 94 coupled to register 92, a down-counter 96 and a right-shift counter 98 coupled to barrel shifter 94. Image buffer 91 comprise at least three areas for storing at least three swaths of data lines. In this example, only two swaths k and k+1 serve for exposure, while a third swath k+2 is filled with new input data. Data from at least 2N−1 consecutive scanning lines of swaths k and k+1 may be provided to memory register 92 having a length of 2N−1 dots. The right cell of register 92 may contain data from section j of exposure line $L_1$ of swath k and the left cell of register 92 contains data from section j of exposure line $L_{N-1}$ of swath k+1. Shifter 94 right-shifts the data in register 92 according to the skewing angle and the N Least Significant Bit (LSB) dots are allocated to N exposure beams. The shifting size is constant during the imaging of the entire section j and is increased when imaging the next section. The section length is loaded into a down-counter 96 for each new section to be imaged. When the section-length counter reaches its terminal count (TC) (end of section), the size of the shift is incremented by a right-shift counter 98 for the next section.

Figure 11:
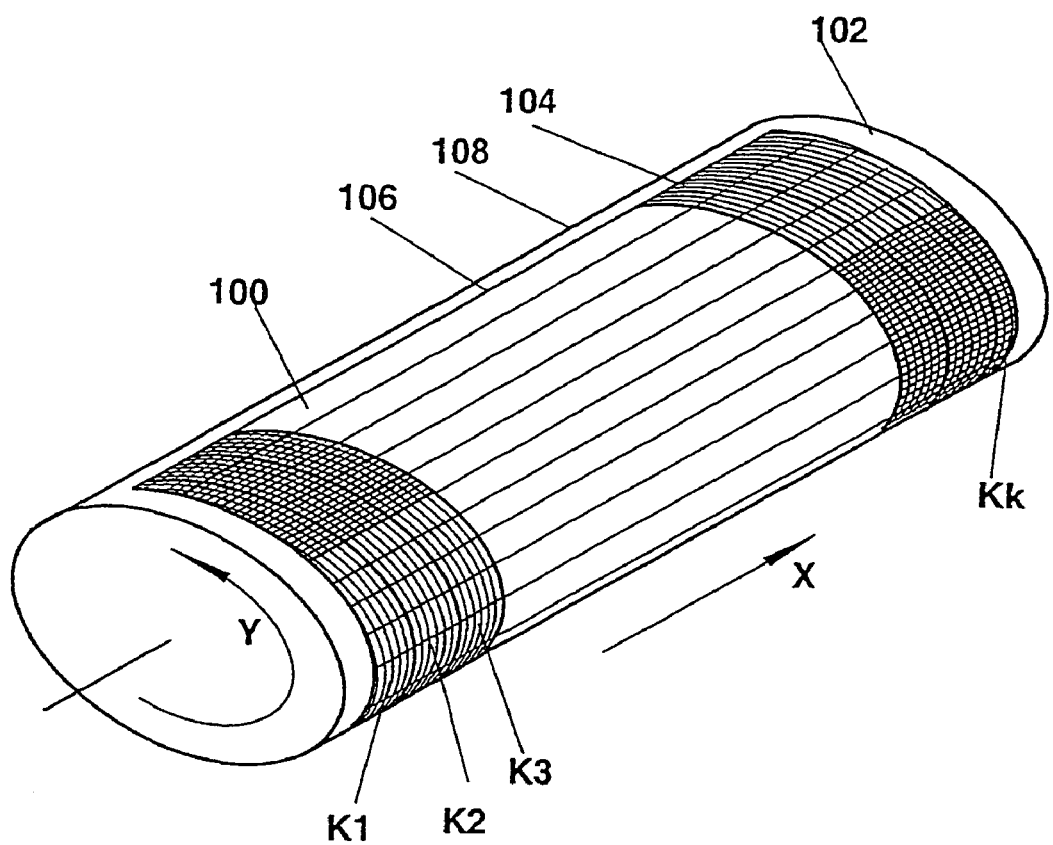
FIG. 11 is a schematic illustration of a plate exposure with a matrix-imaging element, performed according to an embodiment of the present invention.

FIG. 11 illustrates a plate exposure performed according to the embodiment of FIG. 10. In this embodiment, the scanning head comprises a two-dimensional spatial light modulator SLM, such as, an LCD display SVGA1, commercially available from CRL of Middlesex, UK.

The illustration shows an image 100 exposed in a helical mode on a cylinder 102. The pixels of a two-dimensional scanning matrix 104 are gradually activated as the width of a first image swath K1 increases along the fast scanning direction Y. In the successive swathes K2 and K3, all the pixels of the two-dimensional scanning matrix are active and the swath width is constant. The last swath KK is characterized by a gradual deactivation of the recording and/or exposing pixels of two-dimensional scanning matrix 104. The resulting image is rectangular and has its edge 106 parallel to a gripper line 108.

It should be understood by persons of ordinary skill in the art that the skewing of an image on a plate according to the present invention may be performed in any direction. Thus, the method and apparatus described hereinabove may be applied to computer-to-plate exposure devices, as well as to on-press imaging and may be adapted to correct cocking caused by a conventional offset press cylinders misalignment or by helical exposure.

It should be understood by persons of ordinary skill in the art that the image rectifying method and apparatus described hereinabove are applicable to all multi beam and/or multi-element digital writing technologies. These may be ink-jet devices writing by an ink jet array, such as, the Idanit 160A ink jet printer, commercially available from Scitex Ltd, of Herzlia, Israel or by wide format inkjet printing machine such as that commercially available from Aprion Ltd, of Herzlia, Israel.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method comprising:
    supplying successive sections of an input line of a digital image to different imaging beams along a fast scanning direction defined by a vertical resolution,
    supplying each of a plurality of imaging beams with a respective data sequence comprising sections of successive input lines of a digital image, said successive input lines being exposed along a slow scanning direction defined by a horizontal resolution, and
    imaging at least one exposure line with a variable resolution along said fast scanning direction,
    wherein the size of said sections is determined by said variable resolution.

2. The method of claim 1, further comprising altering the data sequence of at least one active imaging beam when the number of active imaging beams is varied.

3. The method of claim 1, further comprising seamlessly attaching the tail of a section of an input line with the head of the next section of said input line.

4. The method of claim 1, further comprising seamlessly attaching the tail of a section of an input line with the head of a section of the following input line.

5. A method comprising:
    supplying each of a plurality of imaging beams with a respective data sequence comprising sections of successive input lines of a digital image so that the image generated by said plurality of imaging beams has desired geometrical properties, wherein said desired geometrical properties include having image edges parallel to a given line orientation, and
    imaging successive lines of at least one exposure along a first scanning direction, each line of said exposure having a variable resolution along a second scanning direction that differs from said first scanning direction,
    wherein the size of said sections is determined by said variable resolution.

6. The method of claim 5, wherein said desired geometrical properties include having image edges parallel to a gripper line of a plate holding system.

7. The method of claim 5, wherein said desired geometrical properties include having image edges parallel to a gripper line of a paper holding system.

8. A method comprising:
    supplying each of a plurality of marking elements with a respective data sequence comprising sections of successive input lines of a digital image along a first scanning direction, and
    recording at least one exposure with a variable resolution along a second scanning direction, said second scanning direction being different than said first scanning direction,
    wherein the size of said sections is determined by said variable resolution.

9. The method of claim 8, further comprising altering the data sequence of at least one active marking element when the number of active marking elements is varied.

10. The method of claim 8, further comprising seamlessly attaching the tail of a section of an input line with the head of the next section of said input line.

11. The method of claim 8, further comprising seamlessly attaching the tail of a section of a particular input line with the head of another section of the following input line.

12. A method comprising
    supplying each of a plurality of marking elements with a respective data sequence comprising sections of successive input lines of a digital image so that the image generated by said plurality of marking elements has desired geometrical properties, said successive input lines being arranged along a first scanning direction, and
    marking with a variable resolution along a second scanning direction, which determines the size of each of said sections,
    said second scanning direction being different than said first scanning direction.

13. The method of claim 12, wherein said desired geometrical properties include having image edges parallel to a gripper line of a printing system.

14. The method of claim 12, wherein said desired geometrical properties include having image edges parallel to a given line orientation.

15. The method of claim 12 further comprises printing in a duplex mode.

16. The method of claim 15, wherein images printed on both sides of a sheet in said duplex mode are imaged at different resolutions.

17. The method of claim 15, wherein said printing uses a different number of active marking elements for each side of a sheet.

18. An imaging system comprising:
a plurality of imaging beams; and
means for supplying each of said imaging beams with a respective data sequence comprising sections of successive input lines of a digital image along a first scanning direction;
wherein the size of said sections is determined by a variable resolution along a second scanning direction;
said second scanning direction being different than said first scanning direction.

19. The system according to claim 18, further comprising means for altering the data sequence of at least one active imaging beam when the number of active imaging beams is varied.

* * * * *